US005212005A

United States Patent [19]

Uehara

[11] Patent Number: 5,212,005

[45] Date of Patent: May 18, 1993

[54] SUPPORT FOR PHOTOGRAPHIC PAPER

[75] Inventor: Hiroshi Uehara, Noda, Japan

[73] Assignee: Mitsubishi Paper Mills Limited, Tokyo, Japan

[21] Appl. No.: 722,509

[22] Filed: Jun. 27, 1991

[30] Foreign Application Priority Data

Jun. 29, 1990 [JP] Japan .................................. 2-171495

[51] Int. Cl.$^5$ .................................................. B32B 3/00

[52] U.S. Cl. ..................................... 428/141; 428/156; 428/172; 428/212; 428/213; 428/339; 428/409; 428/537.5; 428/511

[58] Field of Search ............... 428/156, 167, 409, 910, 428/141, 213, 172, 212, 332, 339, 537.5, 511, 153

[56] References Cited

U.S. PATENT DOCUMENTS 4,352,847 10/1982 Okiyama ............................ 428/141
4,367,511 1/1983 Crass .................................. 428/156
4,413,109 11/1983 Haas ..................................... 264/280
4,546,029 10/1985 Cancio ............................... 428/141
4,677,188 6/1987 Utsumi et al. ....................... 428/480

FOREIGN PATENT DOCUMENTS 60-6944 1/1985 Japan .
63-291054 11/1988 Japan .

*Primary Examiner*—Donald J. Loney
*Attorney, Agent, or Firm*—Cushman, Darby & Cushman

[57] ABSTRACT

Disclosed is a finely embossed type support for photographic paper which has a center-plane average roughness SRa of 1.0–2.0 μm, a center-Plane peak height SRp of 5–7 μm, and a center-plane valley depth of 6–9 μm according to a three-dimensional surface roughness meter. This support for photographic paper has a proper gloss and can be coated with an emulsion at a high speed and has good handling properties.

2 Claims, No Drawings

SUPPORT FOR PHOTOGRAPHIC PAPER

BACKGROUND OF THE INVENTION

The present invention relates to a support for photographic paper and more particularly, to a polyolefin-coated paper for photograph having a finely embossed surface.

Photographic papers include specular type, i.e., those having a smooth and gloss surface and embossed type. The embossed type photographic papers have a finely embossed surface, a matte surface, a silk surface, a cloth surface or the like. Such embossed type photographic papers have the merits that fingerprints are hardly left thereon as compared with on the specular type photographic papers having a smooth surface, they are superior in handling properties (i.e. they can be easily handled because they hardly adhere to each other when piled up) and a sharp image can be obtained owing to their low gloss. Recently, water-resisting supports comprising a paper coated with a polyolefin resin on both sides have been generally used for the purpose of rapid development and these are made by a coating method called melt extrusion method which comprises coating a molten polyolefin resin on both sides of a paper and then cooling the paper.

The embossed type photographic paper is made by using a cooling roll subjected to the desired embossing which is used in the melt extrusion method.

It is needless to say that configuration of the finely embossed surface has an important influence on quality and cost of photographic papers. The configuration determines not only the gloss of photographic papers, but also the maximum speed of coating an emulsion on a support. The present invention provides a support which not only can give a proper gloss as a finely embossed type photographic paper and can stand high-speed coating of an emulsion but also has good handling properties.

The emulsion is coated on a photographic support by an E bar method by which multiple layers are simultaneously coated or a curtain coating method. Especially, in the case of a color photographic paper, 3–8 emulsion layers are simultaneously coated and the total thickness of the emulsion layers is thin, namely, 10–20 μm. In view of productivity and cost, high speed coating is strongly demanded, but there is the problem that shifting of emulsion layer occurs at the time of high speed coating for some configuration of the embossed surface.

It has been found that the shifting of emulsion layers from each other occurs due to the air involved between the emulsion layers for some configuration of the surface of the support when the emulsion layers are coated on the surface of the support.

SUMMARY OF THE INVENTION

A photographic support which maintains the gloss property optimum as a finely embossed photographic paper and besides is free from shifting of emulsion layers caused in high speed coating of emulsions has been obtained by limiting the surface configuration of a finely embossed surface type support to a center-plane average roughness SRa of 1.0—2.0 μm, a center-plane peak height SRp of 5–7 μm, and a center-plane valley depth SRv of 6–9 μm which are measured by a three-dimensional surface roughness meter and preferably by providing 5–20 irregularities having a difference in height of 3–15 μm in a width of 3 mm on the finely embossed surface.

DETAILED DESCRIPTION OF THE INVENTION

It has been found that center-plane average roughness SRa, center-plane Peak height SRp, and center-plane valley depth SRv which are represented by the three-dimensional surface roughness are indications for gloss properties as a support for a photographic paper and for occurrence of shifting of emulsion layers owing to speeding-up of coating of emulsions. That is, a photographic support having an SRa of 1.0–2.0 μm, an SRp of 5–7 μm, and an SRv of 6–9 μm not only gives a proper gloss and hardly causes shifting of emulsion largers even when the emulsion is coated thereon at a higher speed but also has good hardling properties. When the SRa is less than 1.0 μm, gloss is enhanced. When the SRa is more than 2.0 μm and the SRv is more than 9 μm, shifting of the emulsion layers occurs. When the SRp is less than 5 μm, configuration of the finely embossed surface becomes dim so that handling Properties are deteriorated. When the SRv is less than 6 μm, the gloss becomes dazzling or glittering and handling properties are deteriorated. When the SRp is more than 7 μm, the gloss lowers.

SRa, SRP and SRv are respectively defined by the following formulae:

$$SRa = \frac{1}{S_M} \int_o^{L_X} \int_o^{L_Y} |f(X, Y)|\, dXdY \qquad \text{(I)}$$

$$SRp = \max\,(f(X, Y)) - \frac{1}{S_M} \int_o^{L_X} \int_o^{L_Y} f(X, Y) dXdY \qquad \text{(II)}$$

$$SRv = \frac{1}{S_M} \int_o^{L_X} \int_o^{L_Y} f(X, Y) dXdY - \min(f(X, Y)) \qquad \text{(III)}$$

wherein $L_X$ is length of the measured portion in X-axis direction, $L_Y$ is length of the measured portion in Y-axis direction, and $S_M$ is area of the measured portion, namely, $S_M = L_X \times L_Y$. In order to determine these parameters, there can be employed e.g., a surface roughness analyzer SPA-11 (mfd. by Kosaka Kenkyujo K. K.)

Configuration of finely embossed surface of the photographic support is preferably indeterminate and irregular configuration and comprises 5–20 irregularities having a difference in height of 3–15 μm in a width of 3 mm. When the number of the irregularities is less than 5, configuration of the irregularities is emphasized and becomes indefinite. When the number of the irregularities is more than 20, the surface becomes matte and properties as finely embossed surface are lowered.

Various indexes which indicate surface configuration (e.g. center-line average roughness Ra) are specifically described in "An American National Standard, Surface Texture" (Published by The American Society of Mechanical Engineers).

The support for a photographic paper of the present invention is preperably a polyolefin-coated paper. That is, the support preferably comprises a paper substrate and a polyolefin resin layer provided thereon. The polyolefin resin layer has a thickness of preferably 14–40 μm, more preferably 17–32 μm.

The polyolefin used in the Present invention includes homopolymers such as polyethylene, polypropylene, and polyisobutylene; copolymers mainly composed of ethylene, propylene and the like; and mixtures thereof. Preferred is polyethylene. To the polyolefins may be added a pigment, e.g., white pigments such as titanium dioxide and colored pigments such as ultramarine, antioxidants, releasing agents and the like. The fine embossing is carried out on the surface of the polyolefin resin using a cooling roll applied with the desired fine embossing during extrusion coating of the polyolefin resin on a paper substrate. The paper substrate here may contain synthetic pulp or the like as far as it is mainly composed of paper. The fine embossing on the cooling roll can be provided by combination of surface engraving of the roll, indentation method, vapor deposition method, etching method, electrical perforation method, sand blasting method, and the like. It is preferred to carry out chromium double plating as a final finishing. The embossed cooling roll is produced preferably by providing a copper layer 0.2–2 mm in thickness on a steel roll, embossing the copper layer, sandblasting the embossed surface, forming thereon chromium plating 15-50 μm in thickness, and then subjecting the plated surface to abrasive finishing.

DESCRIPTION OF PREFERRED EMBODIMENTS

The present invention will be explained in detail by the following nonlimiting examples.

EXAMPLES 1-7 AND COMPARATIVE EXAMPLE 1-5

A plurality of cooling rolls were made in order to obtain polyethylene resin-coated papers having the surface configuration as shown in Table 1 and one side of a paper substrate for photograph having a basis weight of 170 $g/m^2$ was extrusion coated with a polyethylene resin composition composed of 70% of low-density polyethylene, and 20% of medium-density polyethylene, and 10% of titanium dioxide at a thickness of 30 μm to obtain a photographic support having a finely embossed surface. The back side of the paper substrate was previously extrusion coated with a transparent polyethylene at a thickness of 30 μm.

The finely embossed surface of the photographic support obtained above was measured for SRa, SRp and SRv by use of a surface roughness analyzer SPA-11 (mfd. by Kosaka Kenkyujo K. K.). Cutoff was 0.8 mm and $L_X$ and $L_Y$ were 20 mm each.

The finely embossed surface was subjected to corona discharge treatment to give a surface tension of 48 dynes/cm and each of these samples of the polyethylene-coated papers made using the respective cooling rolls was coated with color emulsions and evaluation of these samples was conducted.

In Table 1 are shown the maximum coating speed at which the emulsions can be stably coated without causing shifting of emulsion layers in each sample and the surface gloss of the photographic papers prepared by coating the emulsions at a coating speed of 100 m/min and subjected to development treatment was evaluated.

TABLE 1

| | | Surface configuration of polyethylene-coated paper | | | Evaluation | | |
|---|---|---|---|---|---|---|---|
| | | SRa, μm | SRp, μm | SPv, μm | Maximum speed at which emulsion can be stably coated, m/mim. | Gloss of photographic paper | Notes |
| Comparative Example | 1 | 0.5 | 6 | 8 | 180 | x | |
| Example | 1 | 1 | 6 | 8 | 180 | Δ | |
| | 2 | 1.6 | " | " | 180 | ○ | |
| | 3 | 2 | " | " | 150 | Δ | |
| Comparative Example | 2 | 2.5 | " | " | 130 | x | |
| | 3 | 1.6 | 4.5 | " | 180 | ○ | Configuration of finely embossed surface became dim. |
| Example | 4 | " | 5 | " | 180 | ○ | |
| | 5 | " | 7 | " | 180 | ○ | |
| Comparative Example | 4 | " | 6 | 5.5 | 180 | x | |
| | 5 | " | 7.5 | 9.5 | 150 | x | |
| Example | 6 | " | 7 | 6 | 180 | ○ | |
| | 7 | " | 7 | 9 | 150 | Δ | |

○: Proper gloss preferable as a photographic paper.
Δ: Somewhat excess gloss with partial dazzling.
x: Excess gloss with strong dazzling which is not suitable for a photographic paper

EXAMPLE 8-12

Cooling rolls having an SRa of 1.5 μm, an SRp of 6 μm and an SRv of 7 μm were made with changing the number of irregularities having a difference in height of 3–15 μm in a width of 3 mm. In the same manner as in Examples 1-7, photographic supports were prepared and emulsions were coated thereon. The results are shown in Table 2.

TABLE 2

| Example | SRa, μm | SRp, μm | SPv, μm | The number of irregu-ration, /3 mm | Maximum coating speed at which the emulsion can be stably coated | Gloss of photographic paper | Handling properties |
|---|---|---|---|---|---|---|---|
| 8 | 1.5 | 5 | 6 | 3 | 180 | 30 | Δ |
| 9 | " | 6 | 7 | 5 | 180 | 25 | ○ |
| 10 | " | 6 | 7 | 10 | 180 | 20 | ○ |

TABLE 2-continued

| Example | SRa, μm | SRp, μm | SPv, μm | The number of irregu-ration, /3 mm | Maximum coating speed at which the emulsion can be stably coated | Gloss of photo-graphic paper | Handling properties |
|---|---|---|---|---|---|---|---|
| 11 | " | 7 | 7 | 20 | 180 | 18 | ∘ |
| 12 | " | 7 | 9 | 24 | 150 | 15 | ∘ |

As shown in Table 1, photographic papers having finely embossed surface which has an SRa of 1.0–2.0 μm, an SRP of 5–7 μm, and an SRv of 6–9 μm have preferable surface characteristics and emulsion can be coated thereon at a high speed.

Furthermore, from Table 2 it can be seen that when configuration of the finely embossed surface is such that the number of irregularities differing in height by 3–15 μm is 5–20/3 mm, the support for photographic papers maintain performance of finely embossed surface and emulsion can be coated thereon at high speed.

What is claimed is:

1. A support for photographic paper having ga finely embossed surface with a center-plane average roughness SRa of 1.0–2.0 μm, a center-plane peak height SRp of 5–7 μm, and a center-plane valley depth SRv of 6–9 μm, which are measured by three dimensional surface roughness meter;

wherein said support for photographic paper is a polyolefin-coated paper.

2. A support for photographic paper according to claim 1, wherein the finely embossed surface has 5–20 irregularities having a difference in height of 3–15 μm in width of 3 mm.

* * * * *